US011196052B2

(12) United States Patent
Yang

(10) Patent No.: US 11,196,052 B2
(45) Date of Patent: Dec. 7, 2021

(54) FLEXIBLE LITHIUM BATTERY

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 57 days.

(21) Appl. No.: 16/487,528

(22) PCT Filed: Aug. 15, 2018

(86) PCT No.: PCT/CN2018/100673
§ 371 (c)(1),
(2) Date: Aug. 21, 2019

(87) PCT Pub. No.: WO2019/062368
PCT Pub. Date: Apr. 4, 2019

(65) Prior Publication Data
US 2020/0058943 A1 Feb. 20, 2020

(30) Foreign Application Priority Data

Sep. 29, 2017 (CN) .......................... 201710908081.9

(51) Int. Cl.
*H01M 50/10* (2021.01)
*H01M 50/102* (2021.01)
(Continued)

(52) U.S. Cl.
CPC ........... *H01M 4/667* (2013.01); *H01M 4/668* (2013.01); *H01M 10/052* (2013.01); *H01M 10/0585* (2013.01)

(58) Field of Classification Search
None
See application file for complete search history.

(56) References Cited

U.S. PATENT DOCUMENTS

2006/0228627 A1 10/2006 Nakayama et al.
2013/0135800 A1* 5/2013 Yang ..................... G02F 1/1339
361/679.01
(Continued)

FOREIGN PATENT DOCUMENTS

CN 101682031 A 3/2010
CN 103247768 A 8/2013
(Continued)

OTHER PUBLICATIONS

English translation of JP 2014/182873 (Year: 2014).*

*Primary Examiner* — Yoshitoshi Takeuchi
(74) *Attorney, Agent, or Firm* — Rabin & Berdo, P.C.

(57) ABSTRACT

The present invention relates to a flexible lithium battery comprising a first current collector layer and a second current collector layer, wherein the first current collector layer has a first outer surface and a first inner surface, and the second current collector layer has a second outer surface and a second inner surface; there is a glue frame sandwiched between the first inner surface and the second inner surface to form a sealed and enclosed space, wherein there is an electrochemical system layer disposed in this sealed and enclosed space, with the electrochemical system layer comprising a first active material layer, a second active material layer, and an electrically insulating layer disposed between the first active material layer and the second active material layer; and there is a flexible adhesive layer disposed between the first inner surface and the first active material layer and/or between the second inner surface and the second active material layer, wherein this flexible adhesive layer consists of an adhesive and an electrically conductive additive, with the adhesive consisting of a linearly structured colloid and a stereoscopically structured colloid.

8 Claims, 4 Drawing Sheets

(51) Int. Cl.
*H01M 50/103* (2021.01)
*H01M 50/105* (2021.01)
*H01M 50/107* (2021.01)
*H01M 50/109* (2021.01)
*H01M 50/11* (2021.01)
*H01M 10/0585* (2010.01)
*H01M 10/058* (2010.01)
*H01M 4/66* (2006.01)
*H01M 10/052* (2010.01)

(56) References Cited

U.S. PATENT DOCUMENTS

2015/0004462 A1\* 1/2015 Huang .................. H01M 50/24
429/127
2015/0380704 A1\* 12/2015 Yang ................... H01M 50/446
429/217

FOREIGN PATENT DOCUMENTS

| CN | 105576280 A | 5/2016 |
| CN | 106784993 A | 5/2017 |
| JP | 2014182873 | \* 9/2014 |

\* cited by examiner

FLEXIBLE LITHIUM BATTERY

BACKGROUND OF THE INVENTION

Field of Invention

The present invention relates to a battery structure, in particular to a flexible lithium battery.

Related Art

In human technology requirements, various wearable electronic devices are correspondingly developed. In order to make the wearable electronic devices conform to the trend of thin and lightweight, the space distribution in the electronic device becomes an important issue. A flexible battery which can be arranged on a non-plane may be one of the solutions to this problem. Please refer to FIG. 1, which is a cross-sectional view of a structure of the conventional flexible lithium battery. As shown, such a flexible lithium battery 10 includes a first current collecting layer 12, a second current collecting layer 14 and a glue frame 16 sandwiched between the first current collecting layer 12 and the second current collecting layer 14 to form an enclosed space 18. A first active material layer 20, an electrical insulation layer 22 and a second active material layer 24 are sequentially arranged in the enclosed space 18. An electrochemical system layer 26 is formed by the first active material layer 20, the electrical insulation layer 22 and the second active material layer 24. The first active material layer 20 is contacted to the first current collecting layer 12, and the second active material layer 24 is contacted to the second current collecting layer 14. The flexible lithium battery 10 is characterized in that the whole can be dynamic bending. However, during bending the current collecting layer 12, 14 is easily separated from the adjacent active material layers 20, 24 to cause a short circuit.

In view of the above factors, the invention provides a brand-new flexible lithium battery in order to overcome the aforementioned problems.

SUMMARY OF THE INVENTION

It is a primary objective of this invention to provide a flexible lithium battery, and a flexible adhesive layer is arranged between the current collecting layer and the active material layer, to avoid a short circuit caused by separating of the current collecting layer and the active material layer during the battery is bent.

Also, it is another objective of this invention to provide a flexible lithium battery. The electrochemical system layer and the flexible adhesive layer are sealed in the enclosed space, which forming by the first current collecting layer, the second current collecting layer and the glue frame.

In order to implement the abovementioned, this invention discloses a flexible lithium battery. The battery includes a first current collecting layer and a second current collecting layer, wherein the first current collecting layer has a first outer surface and a first inner surface, and the second current collecting layer has a second outer surface and a second inner surface, and a glue frame sandwiched between the first inner surface and the second inner surface. The glue frame is closed-structure and its upper and lower surface is adhered to the first inner surface and the second inner surface, respectively. Therefore, an enclosed space is formed by the glue frame, the first current collecting layer and the second current collecting layer. An electrochemical system layer and at least one flexible adhesive layer are disposed in the enclosed space and adjacent to the inner surface of the glue frame. The electrochemical system layer includes a first active material layer, a second active material layer, and an electrically insulating layer disposed between the first active material layer and the second active material layer. The flexible adhesive layer is disposed between the first inner surface and the first active material layer and/or between the second inner surface and the second active material layer. The flexible adhesive layer is composed of an adhesive and an electrically conductive additive, with the adhesive consisting of a linearly structured colloid and a stereoscopically structured colloid.

Wherein the linearly structured colloid is made of a liner polymer. The linear polymer is selected from polyvinylidene fluoride (PVDF), PVDF-HFP, polytetrafluoroethene (PTFE), acrylic acid glue, epoxy, PEO, polyacrylonitrile (PAN), carboxymethyl cellulose (CMC), styrene-butadiene (SBR), polymethylacrylate, polyacrylamide, polyvinylpyrrolidone (PVP) and combinations thereof.

Wherein the stereoscopically structured colloid is made of a cross-linked polymer. The cross-linked polymer is selected from epoxy, acrylic acid resin, polyacrylonitrile (PAN) and combinations thereof with network-structure, or polyimide (PI) and derivatives thereof with ladder-structure.

Wherein the weight ratio of the electrically conductive additive to the adhesive is from 1:1 to 7:3.

Wherein the weight ratio of the electrically conductive additive to the stereoscopically structured colloid is from 5:2 to 7:3.

Wherein the weight ratio of the linearly structured colloid to the stereoscopically structured colloid is from 3:2 to 9:1.

Wherein a thickness of the flexible adhesive layer is 4-10 µm.

Wherein a shape of the electrically conductive additive is spherical shape, tubular shape or sheet-like shape, or a combination thereof.

Wherein the electrically conductive additive with spherical shape is a carbon black.

Wherein an average particle size of the electrically conductive additive with spherical shape is 40 nm.

Wherein a surface area of the electrically conductive additive with spherical shape is 60-300 $m^2/g$.

Wherein the electrically conductive additive with tubular shape is a carbon tube.

Wherein a diameter the electrically conductive additive with tubular shape is 5-150 nm, and a length the electrically conductive additive with tubular shape is 5-20 nm.

Wherein a surface area of the electrically conductive additive with tubular shape is 20-400 $m^2/g$.

Wherein the electrically conductive additive with sheet-like shape is graphite, graphene or a combination thereof.

Wherein an average particle size of the electrically conductive additive with sheet-like shape is 3.5 nm.

Wherein a surface area of the electrically conductive additive with sheet-like shape is 20 $m^2/g$.

DETAILED DESCRIPTION OF THE INVENTION

The invention provides a flexible lithium battery to solve the problem of the short circuit caused by separating of the current collecting layer and the active material layer during the battery is bent.

Figure 1:
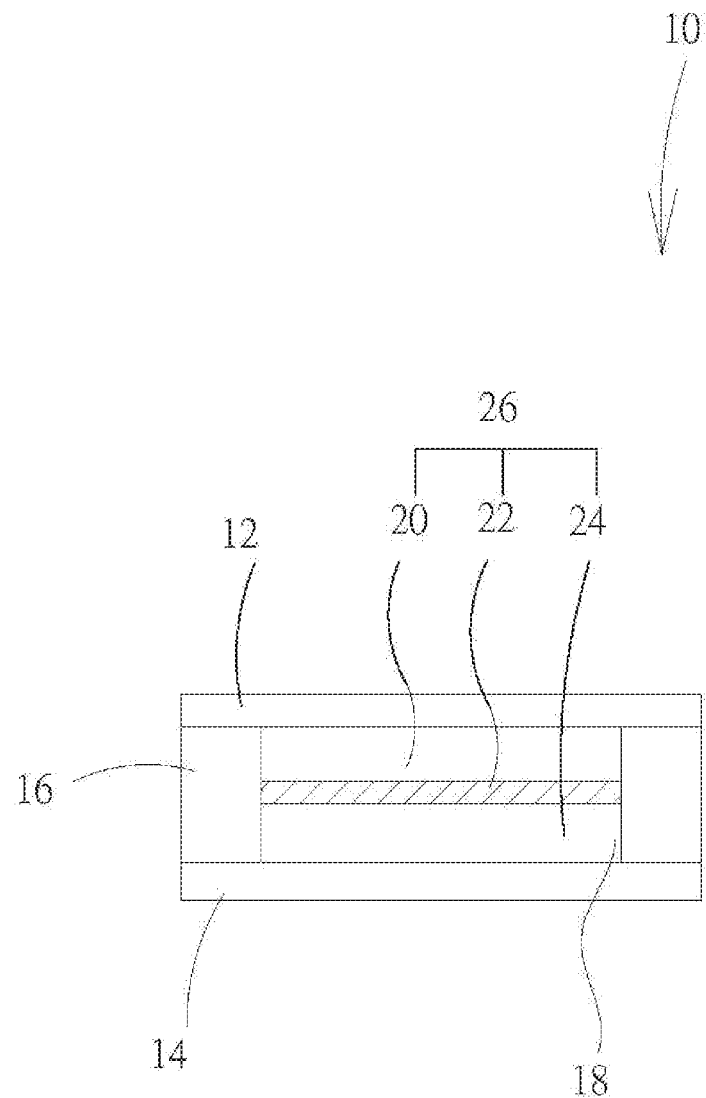
FIG. 1 is a cross-sectional view of the conventional flexible lithium battery.
Figure 2:
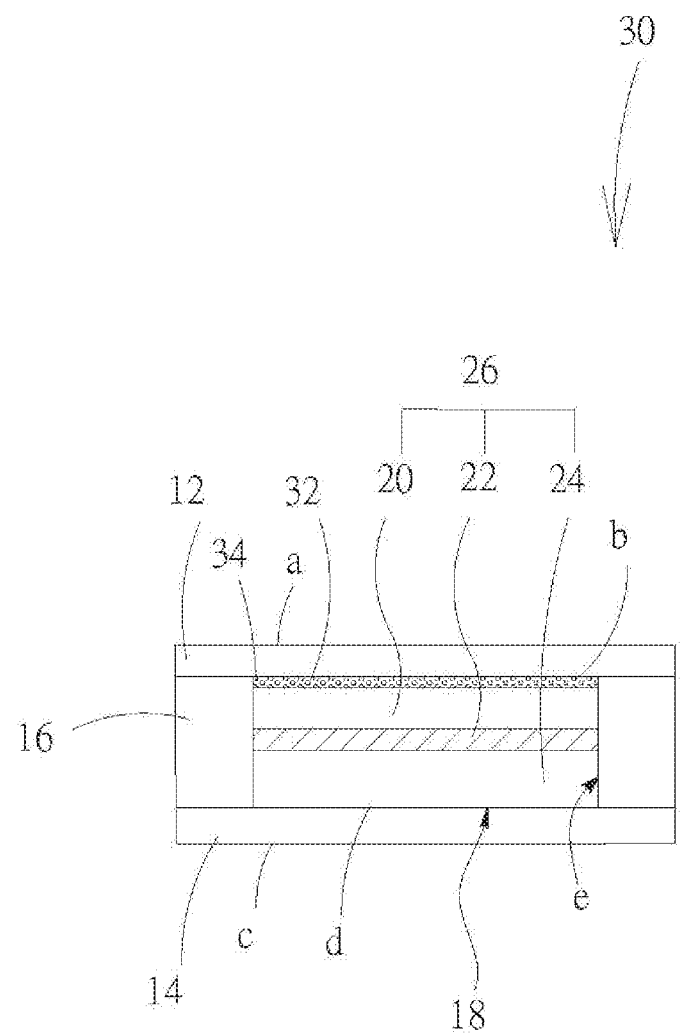
FIG. 2 is a schematic diagram of one embodiment of the flexible lithium battery of this invention.

Please refer to FIG. 2, as shown, the flexible lithium battery 30 according to the invention mainly consists of a first current collecting layer 12, a second current collecting layer 14, a glue frame 16 and an electrochemical system layer 26. The first current collecting layer 12 has a first outer surface a and a first inner surface b. The second current collecting layer has a second outer surface c and a second inner surface d. The a glue frame 16 is sandwiched between the first inner surface b and the second inner surface d. More specifically, the glue frame 16 is closed-structure and its upper and lower surface is adhered to the first inner surface b of the first current collecting layer 12 and the second inner surface d of the second current collecting layer 14, respectively. Therefore, an enclosed space 18 is formed by the glue frame 16, the first current collecting layer 12 and the second current collecting layer 14. The electrochemical system layer 26 is disposed in the enclosed space 18 and adjacent to the inner surface e of the glue frame 16. In the direction from the first current collecting layer 12 to the second current collecting layer 14, the electrochemical system layer 26 includes a first active material layer 20, a second active material layer 24, and an electrically insulating layer 22 disposed between the first active material layer 20 and the second active material layer 24. A first flexible adhesive layer 32 is disposed between the first inner surface b and the first active material layer 20. As the same with the first active material layer 20, the first flexible adhesive layer 32 is adjacent to the inner surface e of the glue frame 16. The first flexible adhesive layer 32 is composed of an adhesive and an electrically conductive additive 34, with the adhesive consisting of a linearly structured colloid and a stereoscopically structured colloid.

The electrochemical system layer 26 and the first flexible adhesive layer 32 are completely sealed within the first current collecting layer 12, the second current collecting layer 14 and the glue frame 16. And the glue frame 16 is still a flexible sealing glue after polymerization reactions. Therefore, the electrochemical system layer 26 and the first flexible adhesive layer 32 are not damaged easily after being bent for many times.

The weight ratio of the electrically conductive additive to the adhesive is from 1:1 to 7:3. The weight ratio of the electrically conductive additive to the stereoscopically structured colloid is from 5:2 to 7:3. The weight ratio of the linearly structured colloid to the stereoscopically structured colloid is from 3:2 to 9:1. The thickness of the first flexible adhesive layer 32 is 4-10 μm.

The shape of the electrically conductive additive 34 is spherical shape, tubular shape or sheet-like shape, or a combination thereof. For example, when the shape of the electrically conductive additive 34 is spherical shape, the electrically conductive additive 34 may be the carbon black. An average particle size of the electrically conductive additive 34 with spherical shape is 40 nm. A surface area of the electrically conductive additive 34 with spherical shape is 60-300 $m^2/g$. When the shape of the electrically conductive additive 34 is tubular shape, the electrically conductive additive 34 may be the is carbon tube. A diameter the electrically conductive additive with tubular shape is 5-150 nm, and a length the electrically conductive additive with tubular shape is 5-20 nm. A surface area of the electrically conductive additive with tubular shape is 20-400 $m^2/g$. When the shape of the electrically conductive additive 34 is sheet-like shape, the electrically conductive additive 34 may be graphite, graphene or a combination thereof. An average particle size of the electrically conductive additive 34 with sheet-like shape is 3.5 nm. A surface area of the electrically conductive additive with sheet-like shape is 20 $m^2/g$.

The linearly structured colloid is made of a liner polymer with certain flexibility. The linear polymer is selected from polyvinylidene fluoride (PVDF), PVDF-HFP, polytetrafluoroethene (PTFE), acrylic acid glue, epoxy, PEO, polyacrylonitrile (PAN), carboxymethyl cellulose (CMC), styrenebutadiene (SBR), polymethylacrylate, polyacrylamide, polyvinylpyrrolidone (PVP) and combinations thereof.

When the stereoscopically structured colloid is made of a cross-linked polymer. The cross-linked polymer is selected from epoxy, acrylic acid resin, polyacrylonitrile (PAN) and combinations thereof with network-structure, or polyimide (PI) and derivatives thereof with ladder-structure.

According to the invention, the characteristic of the cross-linked polymer has good thermal stability and thermal tolerance is utilized. During heat treatment in the assembling process of the flexible battery, such as the hot-pressing process, since the cross-linked polymer can withstand high temperatures without melting, and compared with the linear polymer, the cross-linked polymer having more stereoscopically structured branching, so that under the process conditions of high temperature (or high temperature and pressure), the cross-linked polymer can impede crystalline of the linear polymer. Therefore, the crystal size and degree of crystallinity of the linear polymer are limited. The sterically hindered caused by crystallization is reduced, so that ions can pass more smoothly.

The electrically conductive additive 34 is capable of improving electrical conduction characteristics between the first active material layer 20 and the first current collecting layer 12. The space required to be filled with the linearly structured colloid and the stereoscopically structured colloid is further reduced due to the presence of the electrically conductive additive 34. For example, the space, which need to be filled with the linearly structured colloid and the stereoscopically structured colloid, will be the pitch T between the two adjacent electrically conductive additives 34. Therefore, the crystallization caused by heat treatment or pressurization treatment of the linearly structured colloid can be effectively avoided to increase the flexibility, as shown in FIG. 3.

Figure 3:
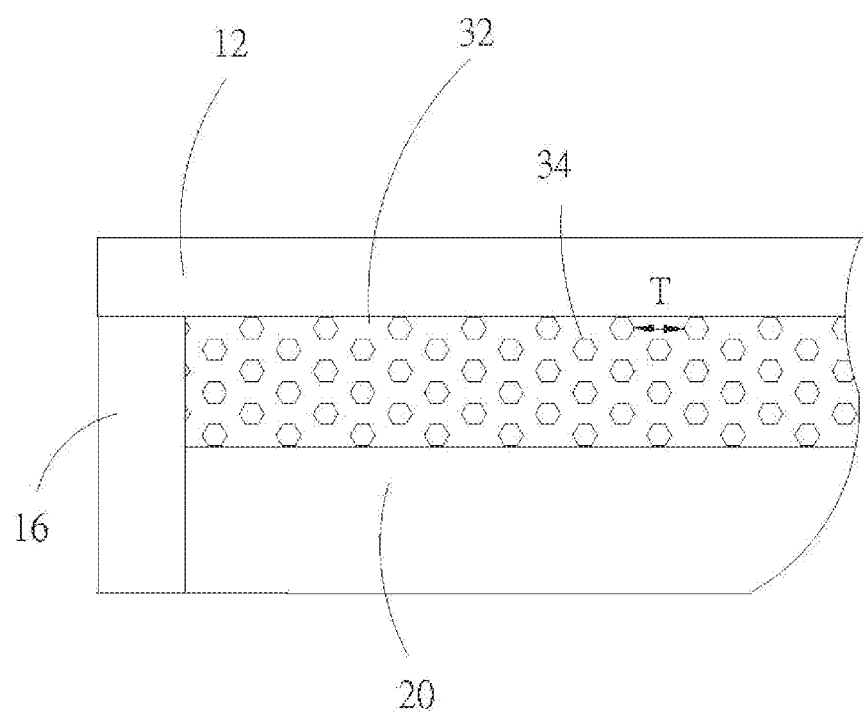
FIG. 3 is a partial enlarged view of FIG. 2 of this invention.

Referring to FIG. 3, when the battery is bent by the external force, the electrically conductive additive 34 can also serve as a bearing point for the first flexible adhesive layer 32. That is, when the size of the electrically conductive additive 34 is small and the number of doping is large enough, the number of bearing points is relatively large. So that the deformation of the adhesive layer between any two bearing points is significantly reduced compared with that of an adhesive without adding the electrically conductive additive 34. In view of the above, the adhesive condition of the first flexible adhesive layer 32 and the first inner surface b of the first current collecting layer 12, and the first active material layer 20 are much improved.

Figure 4:
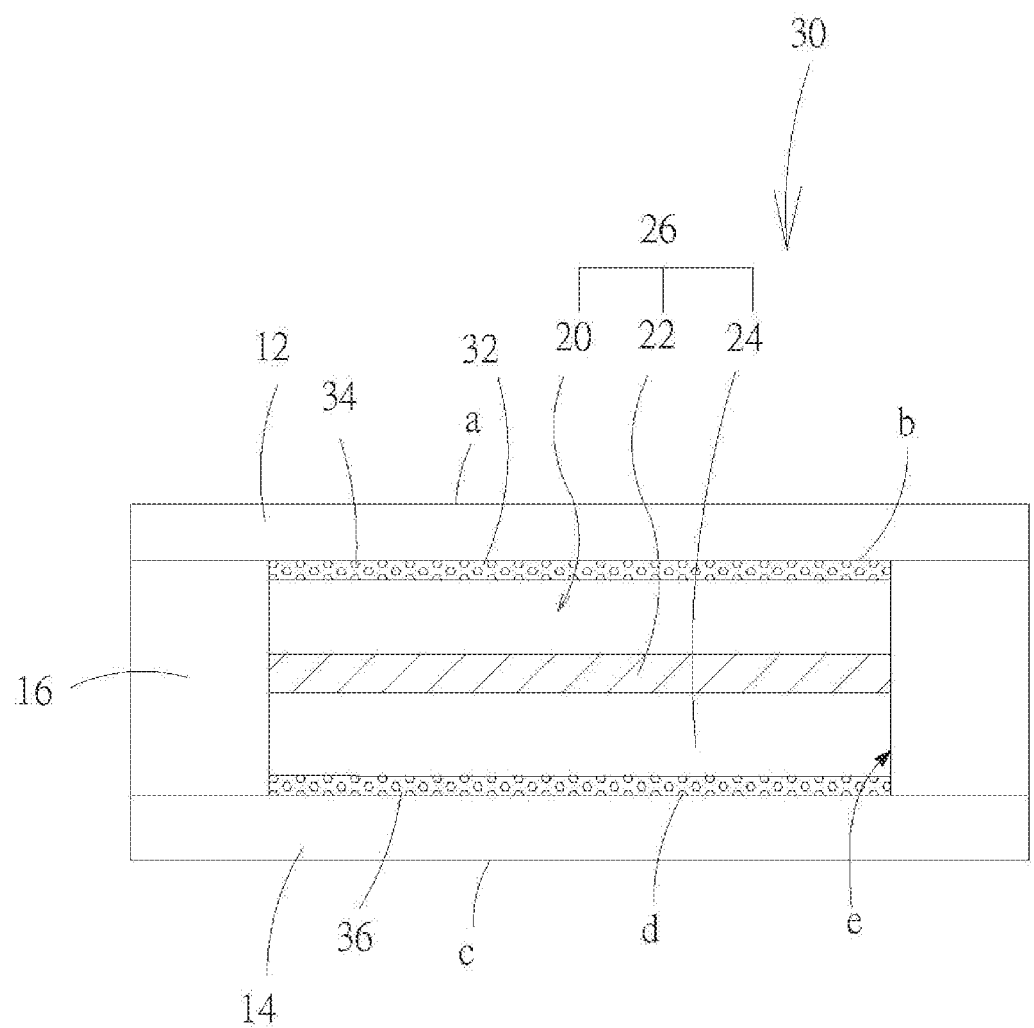
FIG. 4 is a schematic diagram of another embodiment of the flexible lithium battery of this invention.

Although the electrically conductive additive 34 and the adhesive layer described above are only present on a single-side of the electrically insulating layer 22 of the flexible lithium battery 30, the persons skilled in this art may also arrange the same structure on the other side as well. For example, as shown in FIG. 4, a second flexible adhesive layer 36 may be disposed between the second inner surface d and the second active material layer 24 alone or alternatively together with the first flexible adhesive layer 32. The composition of the second flexible adhesive layer 36 is the same as that of the first first flexible adhesive layer 32.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flexible lithium battery, comprising:
a first current collecting layer, having a first outer surface and a first inner surface;
a second current collecting layer, having a second outer surface and a second inner surface;
a glue frame, being closed and sandwiched between the first inner surface and the second inner surface, wherein an upper surface and a lower surface of the glue frame is adhered to the first inner surface and the second inner surface, respectively, and an enclosed space is formed by the glue frame, the first current collecting layer and the second current collecting layer; and
an electrochemical system layer, disposed in the enclosed space and adjacent to the inner surface of the glue frame, wherein the electrochemical system layer includes a first active material layer, a second active material layer, and an electrically insulating layer disposed between the first active material layer and the second active material layer;
characterized in that a flexible adhesive layer is disposed between the first inner surface and the first active material layer and/or between the second inner surface and the second active material layer, wherein the flexible adhesive layer is adjacent to the inner surface of the glue frame and is composed of an adhesive and at least one electrically conductive additive mixing thereof, with the adhesive consisting of a linearly structured colloid and a stereoscopically structured colloid;
wherein a shape of the electrically conductive additive is a sheet-like shape;
wherein an average thickness of the electrically conductive additive with the sheet-like shape is 3.5 nm; and
wherein a surface area of the electrically conductive additive with the sheet-like shape is 20 $m^2/g$.

2. The flexible lithium battery of claim 1, wherein the linearly structured colloid is made of a liner polymer, wherein the linear polymer is selected from polyvinylidene fluoride (PVDF), PVDF-HFP, polytetrafluoroethene (PTFE), acrylic acid glue, epoxy, PEO, polyacrylonitrile (PAN), carboxymethyl cellulose (CMC), styrene-butadiene (SBR), polymethylacrylate, polyacrylamide, polyvinylpyrrolidone (PVP) and combinations thereof.

3. The flexible lithium battery of claim 1, wherein the stereoscopically structured colloid is made of a cross-linked polymer, wherein the cross-linked polymer is selected from epoxy, acrylic acid resin, polyacrylonitrile (PAN) and combinations thereof with network-structure, or polyimide (PI) and derivatives thereof with ladder-structure.

4. The flexible lithium battery of claim 1, wherein the weight ratio of the electrically conductive additive to the adhesive is from 1:1 to 7:3.

5. The flexible lithium battery of claim 1, wherein the weight ratio of the electrically conductive additive to the stereoscopically structured colloid is from 5:2 to 7:3.

6. The flexible lithium battery of claim 1, wherein the weight ratio of the linearly structured colloid to the stereoscopically structured colloid is from 3:2 to 9:1.

7. The flexible lithium battery of claim 1, wherein a thickness of the flexible adhesive layer is 4-10 μm.

8. The flexible lithium battery of claim 1, wherein the electrically conductive additive with the sheet-like shape is graphite, graphene or a combination thereof.

* * * * *